United States Patent
Franke

(10) Patent No.: US 10,979,297 B1
(45) Date of Patent: Apr. 13, 2021

(54) NETWORK INVENTORY REPORTING DEVICE

(71) Applicant: Amazon Technologies, Inc., Seattle, WA (US)

(72) Inventor: Don Franke, Georgetown, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 124 days.

(21) Appl. No.: 16/054,450

(22) Filed: Aug. 3, 2018

(51) Int. Cl.
| | |
|---|---|
| *H04L 12/24* | (2006.01) |
| *H04L 29/08* | (2006.01) |
| *H04L 12/26* | (2006.01) |
| *H04L 12/741* | (2013.01) |
| *H04L 29/06* | (2006.01) |

(52) U.S. Cl.
CPC .............. *H04L 41/12* (2013.01); *H04L 43/04* (2013.01); *H04L 43/12* (2013.01); *H04L 45/745* (2013.01); *H04L 67/303* (2013.01); *H04L 69/22* (2013.01)

(58) Field of Classification Search
CPC . H04L 61/103; H04L 63/1458; H04L 67/125; H04L 67/26; H04L 61/609; H04L 41/12; H04L 67/303; H04L 43/12; H04L 43/04; H04L 45/745; H04L 69/22; H04W 64/0006; H04W 52/0219
See application file for complete search history.

(56) References Cited

U.S. PATENT DOCUMENTS

| | | | | |
|---|---|---|---|---|
| 2013/0305320 | A1* | 11/2013 | Warrick | H04L 61/103 726/4 |
| 2014/0244401 | A1* | 8/2014 | Doughty | G06Q 30/0269 705/14.66 |
| 2016/0269979 | A1* | 9/2016 | Ide | H04W 52/0219 |
| 2017/0280289 | A1* | 9/2017 | Skaaksrud | H04W 64/006 |
| 2017/0324744 | A1* | 11/2017 | Rinzler | G06Q 30/0256 |
| 2018/0359269 | A1* | 12/2018 | Caceres | H04L 63/1458 |

* cited by examiner

*Primary Examiner* — Jungwon Chang
(74) *Attorney, Agent, or Firm* — Thomas Horstemeyer, LLP

(57) ABSTRACT

Disclosed are various embodiments for a network identification device and its integration with other applications. The network identification device can include a number of components, such as a first network interface, a second network interface, a processor, and a memory. A profile that represents a computing device communicatively coupled to the first network interface may be stored in the memory. Machine readable instructions may also be stored in the memory. When executed by the processor, the machine readable instructions may cause the network identification device to process a request for the profile received from a second computing device via the second network interface. The machine readable instructions may also cause the network identification device to send the profile to the second computing device via the second network interface.

20 Claims, 5 Drawing Sheets

NETWORK INVENTORY REPORTING DEVICE

BACKGROUND

Organizations often use a wide variety of devices in their data centers or otherwise connected to their network. Although the devices may be uniquely identifiable, obtaining uniquely identifying information about devices in an automated manner is often impractical. Although a network switch may be aware of the devices connected to it, or a device may be able to provide information about itself if a user authenticates with the device, this requires logging into each switch or device individually. As the number of devices installed in a data center or connected to a network increases, it becomes less feasible to login to or authenticate with each device individually.

Moreover, there is no standard mechanism for logging into or authenticating with network switches or devices. Some devices may require logging in via a secure shell (SSH) client. Other devices may only support logging in via a telnet client. Moreover, some devices may require logging in through a web-based interface. However, each web-based interface may have its own implementation. Moreover, these approaches to logging into or authenticating with a network switch or device may not be consistently implemented. For example, some devices may implement an SSH server or web server on a non-standard port. As a result, each device installed in a data center or attached to a network may require a different approach to logging into the device in order to obtain the desired information about the device.

As a result of the barriers to automating inventorying physical devices installed in a data center or connected to a network, inventory is often tracked manually. For example, when a new device is connected to a switch, a network administrator may update a spreadsheet, database, or similar record with information regarding the new device and where it was installed. However, these manual processes are often error prone. For example, network administrators may accidentally enter incorrect data or forget to update the spreadsheet or database to reflect a change in the network (e.g., when a new device is installed or an existing device is moved of decommissioned).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
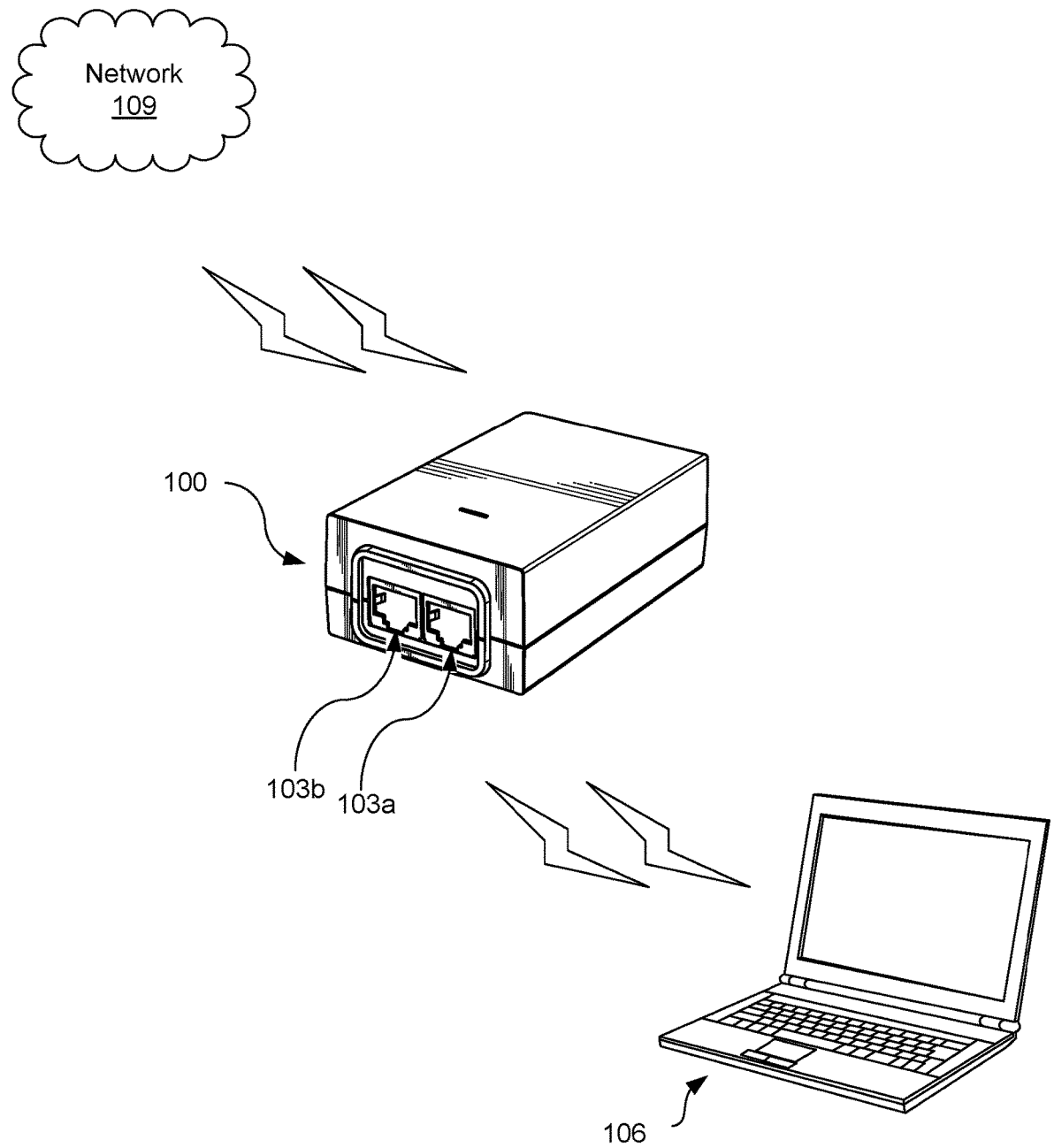
FIG. 1 is a drawing depicting one of several embodiments of the present disclosure.

Disclosed are various embodiments of a hardware device that can be used to provide reporting functionality for inventorying devices connected to a network. One of the fundamental requirements of information and computer security is keeping an accurate record of devices installed on or connected to a computer network. An organization is unable to secure a device (e.g., apply patches, security policies, etc.) if the organization is unaware of the presence or existence of the device. Likewise, an organization is unable to identify unauthorized devices if the organization is not aware of which devices are authorized to be connected to the network.

Therefore, various embodiments of the present disclosure provide for a hardware device that can automatically provide inventory information regarding an attached or associated device on an ongoing basis. As further described herein, the hardware device may sit between the device and the network to which the device is attached. Network traffic sent from the device or destined for the device is forwarded by the hardware device. However, when the hardware device receives a request from a service connected to the network for information about the attached device (e.g., manufacturer, model number, serial number, firmware version, operating system version, etc.), the hardware device can respond with the requested information about the attached device. As a result, organizations can use a single application programming interface or network protocol to query information about any device connected to the network of the organization, regardless of the type of device or manufacturer of the device, when those devices are connected to an embodiment of the present disclosure.

As one skilled in the art will appreciate in light of this disclosure, certain embodiments may be capable of achieving certain advantages. For example, some embodiments may improve network operations by providing a consistent and complete inventory of all devices connected to a network at any given time. As further described in detail herein, the inventory may include the status of a device and its location on the network. Likewise, some embodiments may assist in improving computer system and network security by automatically recognizing the presence of unknown or unauthorized devices connected to the network. Some embodiments may also improve computer system and network security by providing awareness of which devices are connected to the network at any given time, which can enable an organization to known its exposure to specific security vulnerabilities that affect certain devices. Some embodiments can also facilitate thorough security vulnerability assessments by providing accurate identification information to a scanning solution, which enables it to look for security vulnerabilities of a specific device. Other benefits or advantages may also result from the use of one or more implementations of the disclosure, alone or in combination. In the following discussion, a general description of the system and its components is provided, followed by a discussion of the operation of the same.

FIG. 1 depicts an implementation of a network identification device 100 according to various embodiments of the present disclosure. As illustrated, the network identification device 100 has at least two network interfaces 103, depicted as network interfaces 103a and 103b. However, some embodiments of the present disclosure may have additional network interfaces 103. The network identification device 100 may also have non-volatile memory (e.g., some form of read-only memory, flash memory, static random access memory (SRAM), etc.), as well as volatile memory (e.g., dynamic RAM (DRAM)), and one or more processors with one or more processor cores. A first network interface 103a may be connected to a client device 106, while a second network interface 103b may be connected to a network 109 (e.g., switches, routers, or another computing device).

A network interface 103 is a component of a computing device that connects the computing device to a computer network. Network interfaces 103 implement the electronic circuitry required to communicate using a specific physical layers (e.g., wireless radio, copper twisted pair wires, coaxial cables, fiber optic cables, etc.) and data link layer standard (e.g., Ethernet, Wi-Fi, Token Ring, Fiber Distributed Data Interface (FDDI), Fibre Channel, etc.). In some implementations, one or more of the network interfaces 103 may be configured to receive a voltage sufficient to power the network identification device 100 and to provide power for the network identification device 100 (e.g., by implementing a version of the Power over Ethernet (PoE) standard). However, the network identification device 100 may also include its own power supply in some implementations.

As described in further detail herein, the network identification device 100 may be inserted into a larger computer network (e.g., between a client device 106 and the rest of the network 109) to provide automated inventory data. For example, a first network interface 103a may be communicatively coupled (e.g., via a cable inserted into the first network interface 103a) to a first computing device, such as a client device 106. A second network interface 103b may be communicatively coupled (e.g., via a second cable inserted into the second network interface 103b) to the computer network 109 through a switch, hub, router, or similar device. The first network interface 103a may be bridged to the second network interface 103b in order to allow for low-latency forwarding of network traffic between the network interfaces 103a and 103b. However, in implementations that use more than two network interfaces 103, a switch may be implemented between the network interfaces 103 in order to allow for low-latency forwarding of network traffic between a communicatively coupled computing device and the network without flooding other communicatively coupled computing devices connected to other network interfaces 103 with network traffic that is not intended for them.

Traffic from the network 109 may be processed and analyze by the network identification device 100. If the network identification device 100 determines that the traffic includes requests for identifying information of the client device 106, the network identification device 100 can provide an appropriate response. The network identification device 100 can then forward all other traffic on to the client device 106 in a low-latency manner.

Figure 2:
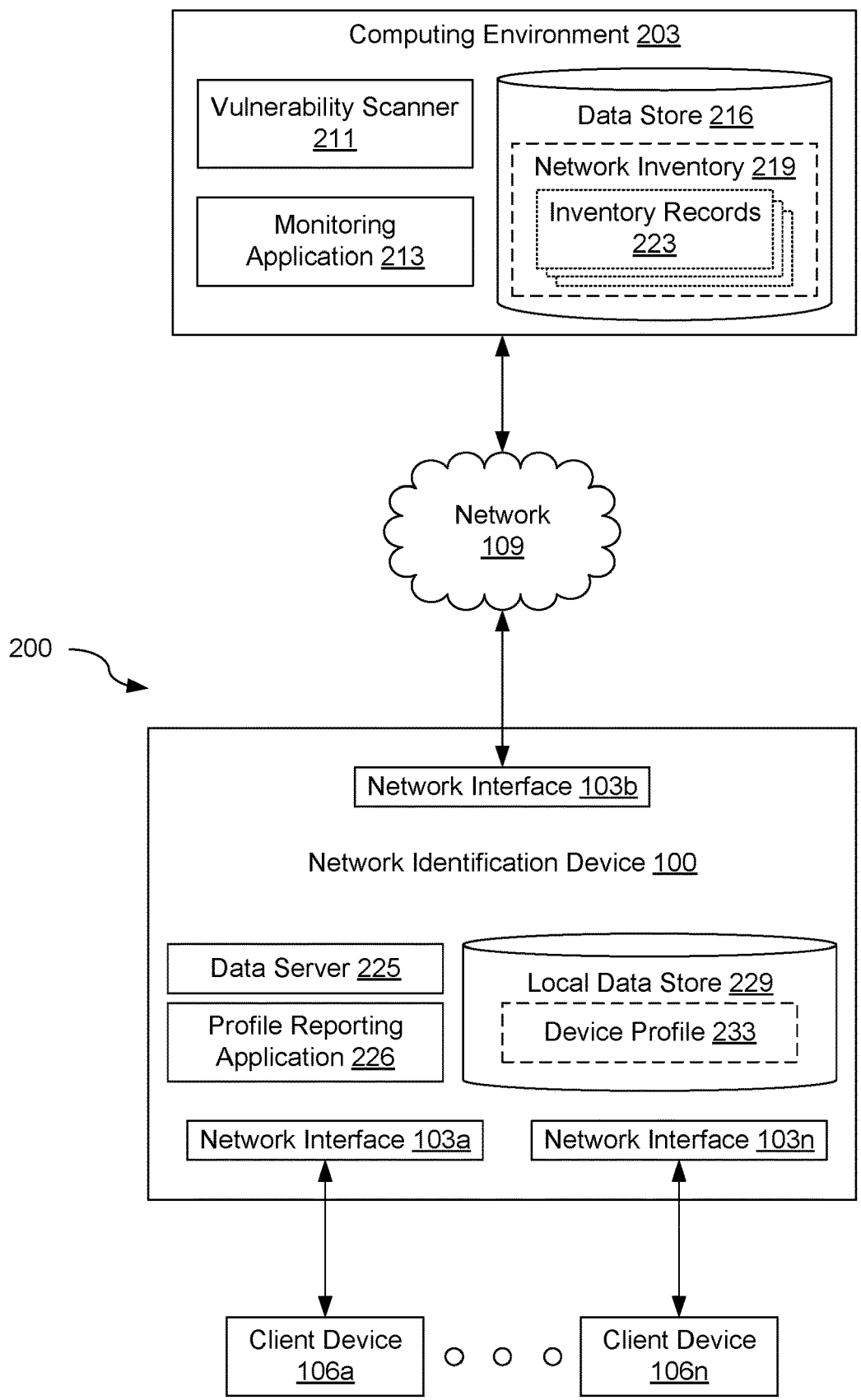
FIG. 2 is a drawing of a networked environment according to various embodiments of the present disclosure.

With reference to FIG. 2, shown is a networked environment 200 according to various embodiments. The networked environment 200 includes a computing environment 203 and one or more client devices 106a-n which are in data communication with each other via a network 109. Positioned between the network 109 and the client devices 106 is a network identification device 100. As previously described, the client devices 106a-n may connect to one or more network interfaces 103 (FIG. 1) of the network identification device 100, while the network identification device 100 is connected to a switch, router, hub, or other edge or gateway device within the network 109.

The network 109 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource, or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include the vulnerability scanner 211, the monitoring application 213, and potentially other applications configured to interact with the network identification device 100. Other applications, services, processes, systems, engines, or functionality not discussed in detail herein may also be executed by the computing environment 203.

Also, various data is stored in a data store 216 that is accessible to the computing environment 203. The data store 216 may be representative of a plurality of data stores 216, which can include relational databases, object-oriented databases, hierarchical databases, hash tables or similar key-value data stores, as well as other data storage applications or data structures. The data stored in the data store 216 is associated with the operation of the various applications or functional entities described below. This data can include a network inventory 219, and potentially other data.

The vulnerability scanner 211 is executed to identify vulnerabilities or potential vulnerabilities of client devices 106 connected to the network 109. In some instances, the vulnerability scanner 211 may periodically send requests to client devices 106 to determine which client devices 106 are connected to the network 109. In response to these requests, the network identification devices 100 associated with the respective client devices 106 would provide responses about which client devices 106 were currently connected to the network 109. In other instances, the vulnerability scanner 211 could instead query the network inventory 219 of client devices 106 assembled by the monitoring application 213 to determine which client devices 106 are connected to the network 109. The vulnerability scanner 211 could then use data about the connected client devices 106 to determine which client devices 106 may contain vulnerabilities, such as a specific client device 106 or specific operating system version having a known vulnerability.

The monitoring application 213 is executed to monitor the status of client devices 106 attached to the network 109 and update the network inventory 219 in response to changes to the client devices 106 connected to the network 109. For example, the monitoring application 213 may periodically send requests to client devices 106 to determine which client devices 106 are connected to the network 109. In response to the requests, the network identification devices 100 associated with the respective client devices 106 would provide responses about which client devices 106 were currently connected to the network 109. The monitoring application 213 could then update the network inventory 219 in response. For example, the monitoring application 213 could add or remove individual inventory records 223 or update individual inventory records 223 to reflect changes.

The network inventory 219 represents data regarding client devices 106 connected to the network 109. For example, the network inventory 219 may include a collection of inventory records 223. Each inventory record 223 may represent data about a respective client device 106 connected to the network 109, including the manufacturer of the client device 106, the model of the client device 106, the serial number or similar unique identifier of the client device 106, the network address of the client device 106 (e.g., internet protocol version 4 (IPv4), internet protocol version 6 (IPv6), media access control (MAC) address, or similar network address), information about the operating system or firmware installed on the respective client device 106 (e.g., the version of the operating system or firmware), and potentially other data.

The network identification device 100 can have a number of components. For example, the network identification device 100 can have one or more network interfaces 103a-n. The network identification device 100 can also include one or more processors execute various applications or machine-readable instructions and one or more memories to store data or applications to be executed by the network identification device 100.

Accordingly, the network identification device 100 can execute various applications to implement the functionality provided by the network identification device 100. For example, the network identification device 100 could execute a data server 225 (e.g., that implements a file transfer protocol, such as trivial file transfer protocol (TFTP)), a profile reporting application 226, and potentially other applications. The network identification device may also have a local data store 229. The local data store 229 can include relational databases, object-oriented databases, hierarchical databases, hash tables or similar key-value data stores, as well as other data storage applications or data structures. The data stored in the local data store 229 is associated with the operation of the various applications or functional entities described below. This data can include one or more device profiles 233 and potentially other data.

The data server 225 can be executed in order to receive information from computing devices communicatively coupled to one of the network interfaces 103 (FIG. 1) of the network identification device 100. For example, when the network identification device 100 is in a configuration mode, the data server 225 may allow for a client device 106 to upload a device profile 233 to the network identification device 100. The data server 225 could then store the device profile 233 in the local data store 229. In some implementations, a trivial file transfer protocol (TFTP) server could be used as the data server 225. Moreover, some implementations of the data server 225 may require that the network identification device 100 authenticate with the data server 225, such as by providing a valid, authorized cryptographic certificate to the data server 225 that identifies the client device 106. However, other types of servers implementing other types of protocols may also be used to provide for similar functionality.

The profile reporting application 226 is executed to monitor network traffic received from the network 109 for requests from the monitoring application 213 for information related to the client device(s) 106 attached to the network identification device 100. In response to the requests received from the monitoring application 213, the profile reporting application 226 may provide a copy of each device profile 233 stored in the local data store 229. In other instances, however, the profile reporting application 226 could provide one or more items of information stored within the device profile 233 in response to a specific query from the monitoring application 213, rather than the entire device profile 233.

In some instances, the profile reporting application 226 may provide a mechanism for a network identification device 100 to authentication with the profile reporting application 226. This could include the network identification device 100 communicating with the profile reporting application 226 using previously authorized encryption keys to authentication a secure shell (SSH) session, the network identification device 100 signing messages or responses with an authorized cryptographic certificate signed by an authorized or trusted certificate authority, or other mechanisms. These mechanisms could be configured by a network administrator using a web portal, or could be preset by a manufacturer of the network identification device 100 at the factory or time of manufacture.

A device profile 233 represents information about a client device 106 associated with the network identification device 100, such as a client device 106 communicatively coupled to the network identification device 100. For example, the device profile 233 could include the name of the client device 106, the manufacturer of the client device 106, the model or model number of the client device 106, the serial number of the client device 106 or other unique identifiers, the version of the firmware or operating system currently installed on the client device 106, and potentially other data. The device profile 233 may be uploaded when the network identification device 100 is first configured and installed in the network environment 200. Moreover, the device profile 233 may be updated by either the monitoring application 213 or the client device 106 after initial configuration of the network identification device 100. For example, the monitoring application 213 or the client device 106 could update the device profile 233 in response to a change in the version of the firmware or operating system installed on the client device 106 (e.g., after an update of the firmware or operating system occurred).

The client devices 106a-n are representative of a plurality of client devices that may be coupled to the network 109. The client device 106a-n may include, for example, a processor-based system such as a computer system. Such a computer system may be embodied in the form of a server computer, a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), network connected "smart devices" or appliances (e.g., network connected cameras, microphones, doorbells, locks, refrigerators, etc.), media playback devices (e.g., media streaming devices, BluRay® players, digital video disc (DVD) players, set-top boxes, and similar devices), a videogame console, or other devices with like capability. A client device 106 may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the client device 106 or may be connected to the client device 106 through a wired or wireless connection. Each client device 106a-n may also include its own network interface, thereby allowing the client devices 106a-n to connect to and communicate with the network 109.

Next, a general description of the operation of the various components of the networked environment 200 is provided. More details about the operations of individual components within the networked environment 200 are provided later in the present application.

To begin, a network administrator can configure the network identification device 100. For example, the network administrator may connect the network identification device 100 to a personal computer or mobile device via a network interface 103 and upload a device profile 233 representing a client device 106 to the network identification device 100. The network administrator could then use a TFTP client executed by his or her personal computer or mobile device to upload the device profile 233 to the network identification device 100. Prior to uploading the device profile 233, the network administrator may configure the device profile 233 to include information about the client device 106 such as the name of the client device 106, the manufacturer, the model name or model number, the serial number, or other information.

The network administrator can then insert the network identification device 100 inline between the client device 106 and a network 109 access point, such as a switch, router, hub, or similar gateway device. For example, the network administrator may connect the client device 106 to a first network interface 103a (FIG. 1) with a first network cable, and connect the second network interface 103b of network identification device 100 to the network 109 via a second network cable.

The network identification device 100 then intercepts and forwards all network traffic sent from or received by the client device 106. For example, the network identification device 100 may forward all network traffic sent from the client device 106 without any processing, while intercepting all network traffic received by the client device 106 for processing to identify specially formatted messages from the monitoring application 213. In some implementations, the network identification device 100 could process network traffic in-line, forwarding each packet, frame, or other data unit to the client device 106 after the network identification device 100 has analyzed it to determine whether it contains a message from the monitoring application 213. In other implementations, the network identification device 100 could copy all intercepted network traffic and then immediately forward the network traffic to its destination while processing the copied packets, frames, or other data units.

The network identification device 100 can then provide information about the client device 106 to the monitoring application 213. For example, the monitoring application 213 may send specially formatted requests to the client device 106 at periodic intervals, in response to an event, or on-demand in order to update the network inventory 219. The profile reporting application 226 of the network identification device 100 could identify the specially formatted request within the intercepted network traffic and provide the monitoring application 213 with a response. The response could include the device profile 233 or specific items of information contained in the device profile 233.

Upon receiving the response from the profile reporting application 226 of the network identification device 100, the monitoring application 213 could perform a number of actions. For example, the monitoring application 213 could update an inventory record 223 corresponding to respective client device 106, such as updating a network address or network location of the client device 106. As another example, the monitoring application 213 could create a new inventory record 223 to reflect the connection of a new client device 106 to the network 109.

Similarly, if the monitoring application 213 fails to receive a device profile 233, the monitoring application 213 may rely on the failure as an indication of the presence of an unauthorized client device 106 connected to the network 109. The monitoring application 213 could then report the presence of the potentially unauthorized client device 106, such as by recording an entry to a log or log file, or by sending a notification to a designated user or client device (e.g., an email to a designated email address).

Moreover, the combination of the monitoring application 213 and network identification devices 100 may allow for patches to be applied the client devices 106 in a consistent manner. For example, the monitoring application 213 could query network identification devices 100 for the current version of the firmware, operating system, or other applications installed on respective client devices 106. This information could then be used to push security patches to client devices 106 and ensure that client devices 106 are not accidentally left unpatched.

Figure 3:
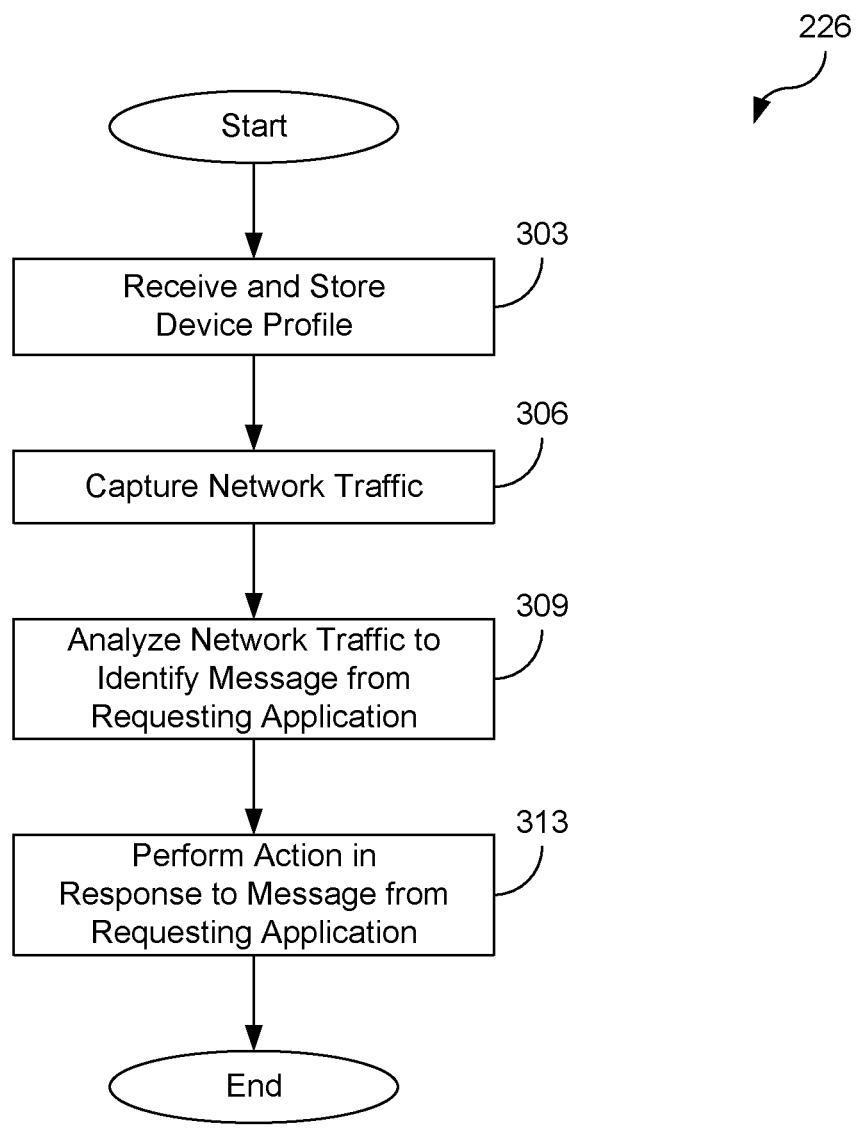
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the profile reporting application 226 (FIG. 2) according to various embodiments. It is understood that the flowchart of FIG. 3 provides merely an example of the many different types of functional arrangements that may be employed to implement the operation of the portion of the profile reporting application 226 as described herein. As an alternative, the flowchart of FIG. 3 may be viewed as depicting an example of elements of a method implemented in the network identification device 100 (FIG. 2) according to one or more embodiments.

Beginning with box 303, the profile reporting application 226 may receive a device profile 233 (FIG. 2) from another computing device and store the device profile 233 in the local data store 229 (FIG. 2). For example, the device profile 233 may be received from a client device 106 (FIG. 2) (e.g., a laptop or desktop of a network administrator or a technician) during the initial setup of the network identification device 100. As another example, the device profile 233 may correspond to an updated device profile 233 received from either the monitoring application 213 (FIG. 2) or a client device 106 connected to the network identification device 100. This could occur as a result of changes to the client device 106 associated with the device profile 233 (e.g., an update to the firmware or operating system, a change in the hardware configuration, a change to the name, or similar changes).

Moving to box 306, the profile reporting application 226 captures network traffic received from second network interface 103b (FIG. 1) attached to the network 109 (FIG. 1). Because the profile reporting application 226 is capturing network traffic to identify requests from applications that may query the network identification device 100, such as the vulnerability scanner 211 or the monitoring application 213, the profile reporting application 226 may be configured to capture network traffic from the network interface 103 through which requests from applications such as the vulnerability scanner 211, the monitoring application 213, or similar applications would be received. Since applications such as the vulnerability scanner 211 or the monitoring application 213 do not execute on the client device 106, the network traffic received from the network interface 103a to which the client device 106 is attached may be ignored in some embodiments in the interests of processing efficiency. In other embodiments, however, network traffic may be captured on all network interfaces 103 of the network identification device 100.

To capture the network traffic, the profile reporting application 226 may temporarily store a copy of each internet protocol (IP) packet, Ethernet frame, or other data unit used at layer two or layer 3 of the Open Systems Interconnection (OSI) network model. Once a copy is saved to working memory of the network identification device 100, the profile reporting application 226 may forward the network traffic onto the destination, such as the client device 106. Network traffic may be copied-and-forwarded in order to avoid introducing latency into the network traffic by analyzing each captured data unit at box 309 before determining whether to forward the data unit of network traffic.

At box 309, the profile reporting application 226 analyzes the captured network traffic to identify messages from applications such as vulnerability scanner 211, the monitoring application 213, or other applications configured to communicate with the network identification device 100. One example of a message from the vulnerability scanner 211 or the monitoring application 213 could include a request for a copy of the device profile 233. A similar example would include a request for information contained in the device profile 233 instead of the entire device profile 233. Another example of a message could include an instruction from the monitoring application 213 to update the device profile 233 to reflect changes in the status of the client device 106.

Messages could be recognized through a number of approaches. Although the present application describes a number of example approaches, other approaches could also be used according to various embodiments of the present disclosure. Moreover, one or more approaches could be used in combination in some embodiments.

A first example approach could include searching the network traffic for specially crafted for Ethernet frame that contained a predefined payload. For example, an Ethernet frame received on the network interface 103 connected to the network 109 might contain the MAC address of the client device 106 as the destination address of the Ethernet frame, but also include the MAC address of the client device 106 as the payload. In some implementations, the MAC address of the client device 106 might be repeated several times in a row to differentiate the specially crafted Ethernet frame from another Ethernet frame that happened to have a single sequence of bytes that matched the MAC address of the client device 106 by chance. However, other predefined Ethernet payloads could also be used.

A second, similar example approach could be used with IPv4 or IPv6 packets. An IPv4 or IPv6 packet with a destination IPv4 or IPv6 address of the client device 106 could have a specific, predefined payload. For instance, the payload could be the IPv4 or IPv6 address of the client device 106 specified several times in a row. However, other predefined payloads could also be used.

A third approach could involve determining whether an IPv4 or IPv6 packet has a predefined port number. If the IPv4 or IPv6 packet has the predefined port number specified in the packet header, then the profile reporting application 226 could recognize the IPv4 or IPv6 packet as a message from the monitoring application 213. Although any port number could be used, some implementations may elect to use a port number that has not been already reserved for other applications in order to avoid confusing network traffic between the profile reporting application 226 and the monitoring application 213. For example, port 80 is reserved for web servers providing unencrypted hypertext transfer protocol (HTTP) connections and port 443 is reserved for web servers providing encrypted HTTP connections using a version of the secure sockets layer (SSL) or transport layer security (TLS) protocols. Therefore, some implementations might elect to use a different port in order to avoid having network traffic between the profile reporting application 226 and the monitoring application 213 confused with network traffic between the network and a web server hosted by the client device 106.

Once the message is identified, the profile reporting application 226 can then identify the type of message. For example, a portion of the payload of the Ethernet frame or IP packet may be reserved to store a value indicating the type of message being sent from the vulnerability scanner 211 or the monitoring application 213. The profile reporting application 226 could analyze the reserved portion of the payload to determine the type of message sent from the vulnerability scanner 211 or monitoring application 213.

Then at box 313, the profile reporting application 226 performs an action in response to the message received. For example, if the profile reporting application 226 had received a request for the device profile 233, the profile reporting application 226 could send the device profile 233 to the requesting application (e.g., the vulnerability scanner 211 or the monitoring application 213) in response. Similarly, if the request were for only a portion of the device profile 233 (e.g., manufacturer name), the profile reporting application 226 might provide the requested portion in response. If the request were to update the device profile 233 (e.g., to indicate a new firmware or operating system version number), the profile reporting application 226 could update the device profile 233. In some instances, the profile reporting application 226 could also send an acknowledgement response indicating that the device profile 233 had been successfully updated.

Figure 4:
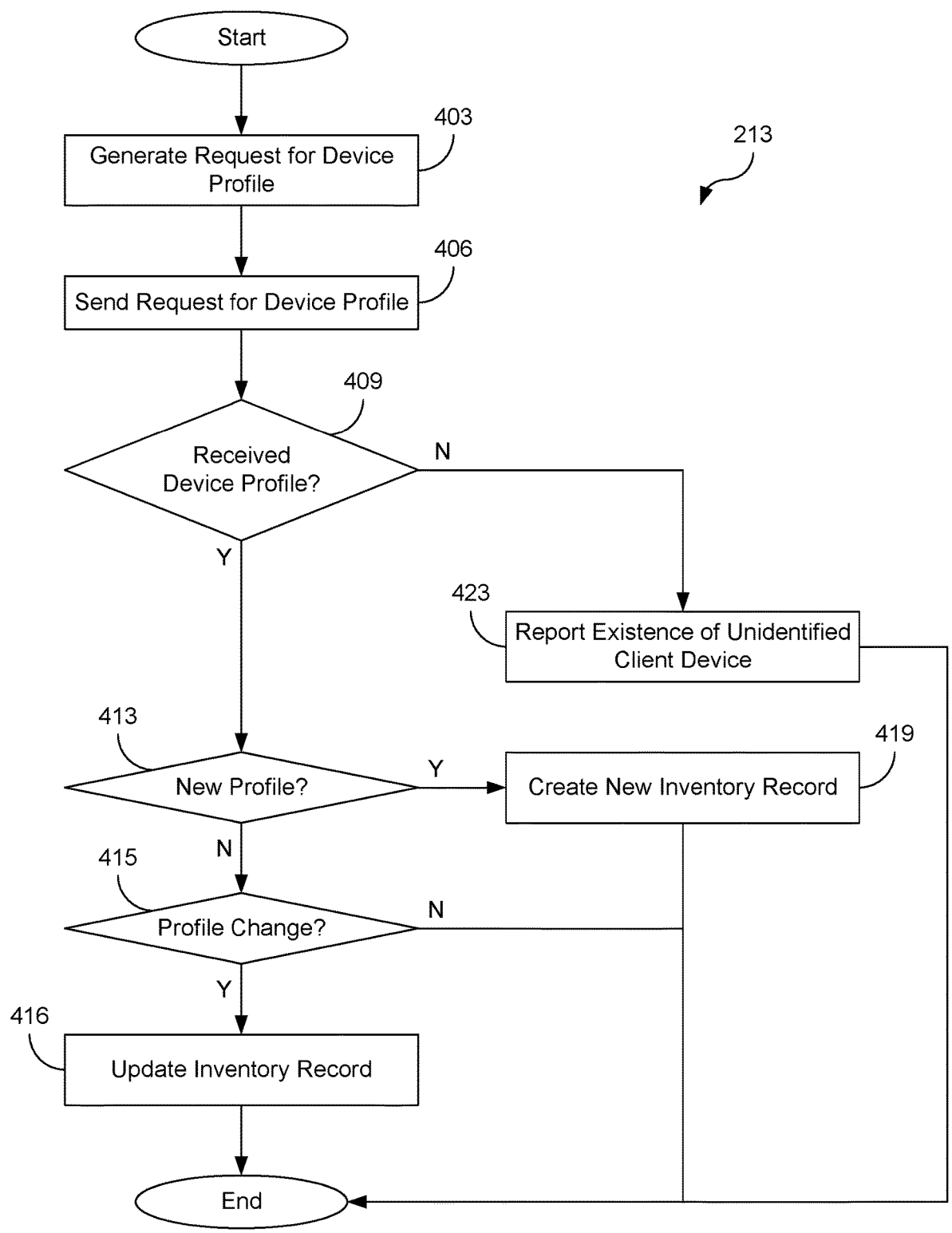
FIG. 4 is a flowchart illustrating one example of functionality implemented as portions of an application executed in a computing environment in the networked environment of FIG. 2 according to various embodiments of the present disclosure.

Referring next to FIG. 4, shown is a flowchart that provides examples of the operation of portions of the monitoring application 213 according to various embodiments. It is understood that the flowchart of FIG. 4 provides merely an example of the many different types of functional arrangements that may be employed to implement the operation of the portion of the monitoring application 213 as described herein. As an alternative, the flowchart FIG. 4 may be viewed as depicting an example of elements of a method implemented in the computing environment 203 (FIG. 2) according to one or more embodiments.

Beginning with box 403, the monitoring application 213 generates a request for a device profile 233. As the monitoring application 213 does not necessarily know which client devices 106 are attached to particular switch ports or assigned a particular IPv4 or IPv6 address, or which client devices 106 are communicatively coupled to a network identification device 100, the monitoring application 213 may generate a special data unit (e.g., Ethernet frame, IPv4 packet, IPv6 packet, etc.) addressed to a client device 106, but formatted to convey a message to a network identification device 100 that is capturing and analyzing network traffic destined for the client device 106. A number of approaches for generating the request may be used.

As a first example, the monitoring application 213 could generate a specially crafted Ethernet frame that contains a predefined payload. For example, the monitoring application 213 could generate an Ethernet frame that contains the MAC address of the client device 106 as the destination address of the Ethernet frame, but also includes the MAC address of the client device 106 as the payload. In some implementations, the MAC address of the client device 106 might be repeated several times in a row to differentiate the specially crafted Ethernet frame from another Ethernet frame that happened to have a single sequence of bytes that matched the MAC address of the client device 106 by chance. However, other predefined Ethernet payloads could also be used.

A second, similar example approach could be used with IPv4 or IPv6 packets. An IPv4 or IPv6 packet with a destination IPv4 or IPv6 address of the client device 106 could have a specific, predefined payload. For instance, the payload could be the IPv4 or IPv6 address of the client device 106 specified several times in a row. However, other predefined payloads could also be used.

A third approach could involve generating an IPv4 or IPv6 packet with a predefined port number. If the IPv4 or IPv6 packet has the predefined port number specified in the packet header, then the profile reporting application 226 could recognize the IPv4 or IPv6 packet as a message from the monitoring application 213. Although any port number could be used, some implementations may elect to use a port number that has not been already reserved for other applications in order to avoid confusing network traffic between the profile reporting application 226 and the monitoring application 213. For example, port 80 is reserved for web servers providing unencrypted hypertext transfer protocol (HTTP) connections and port 443 is reserved for web servers providing encrypted HTTP connections using a version of the secure sockets layer (SSL) or transport layer security (TLS) protocols. Therefore, some implementations might elect to use a different port in order to avoid having network traffic between the profile reporting application 226 and the monitoring application 213 confused with network traffic between the network and a web server hosted by the client device 106.

At box 406, the monitoring application 213 sends the request for the device profile 233 to the client device 106. The monitoring application 213 then waits for a response at box 409. If a response containing the requested device profile 233 is received, then execution proceeds to box 413. However, if no response is received (e.g., because there is not a network identification device 100 assigned to the client device 106), then the process instead proceeds to box 423.

Proceeding to box 413, the monitoring application 213 determines whether the device profile 233 is a new device profile 233 representing a new client device 106 connected to the network 109. For example, the monitoring application 213 may determine whether the device profile 233 has a corresponding inventory record 223 in the network inventory 219 (FIG. 2). If the device profile 233 has a respective inventory record 223 in the network inventory 219, then the monitoring application 213 proceeds to box 415. However, if the device profile 233 lacks a respective inventory record 223, indicating that a new client device 106 has been connected to the network 109, then the monitoring application 213 proceeds to box 419.

At box 415, the monitoring application 213 may check to see if the device profile 233 has changed since the last time that the device profile 233 was queried. For example, the monitoring application 213 may compare the device profile 233 to a corresponding inventory record 223 for the client device 106. If the device profile 233 matches the inventory record 223, then no updates are needed and the process ends. However, if there is a mismatch between the device profile 233 and the corresponding inventory record 223 (e.g., operating system or firmware versions no longer match, the internet protocol (IP) address has changed, etc.), then the monitoring application 213 can proceed to box 416.

At box 416, the monitoring application 213 may update an inventory record 223 representing the client device 106. For example, if the client device 106 is currently assigned a different IPv4 or IPv6 address than was previously reflected in the inventory record 223 for the client device 106, the inventory record 223 may be updated to reflect the new IPv4 or IPv6 address. As another example, if the device profile 233 indicates that the client device 106 has a more recent version of firmware or a more recent version of an operating system installed, then the monitoring application may update the appropriate inventory record 223 to reflect the current version. Other updates to the inventory record 223 may be performed based at least in part on the information contained in the received device profile 233.

However, if the monitoring application 213 has proceeded to box 419, the monitoring application 213 creates a new inventory record 223 in the network inventory 219 for the newly connected client device 106. The values for the various data fields in the inventory record 223 may be populated with the values of corresponding data fields in the device profile 233. After the new inventory record 223 is created, execution ends.

At box 423, however, the monitoring application 213 may report the existence of an unidentified client device 106. For example, the monitoring application 213 may record an entry in a log file or send an email to a designated email address indicating that no device profile 233 was received from a particular client device 106. Because unauthorized or hostile devices may not be paired with a network identification device 100, the existence of a client device 106 without a communicatively coupled network identification device 100 on the network 109 may be unauthorized, hostile, or misconfigured (e.g., connected to the network 109 in violation of a policy requiring the use of network identification devices 100 for all connected client devices 106). As a result, the presence of unauthorized and potentially hostile or malicious devices connected to the network 109 can be detected by network administrators or information security personnel. After the existence of the unidentified client device 106 is reported execution then ends.

Figure 5:
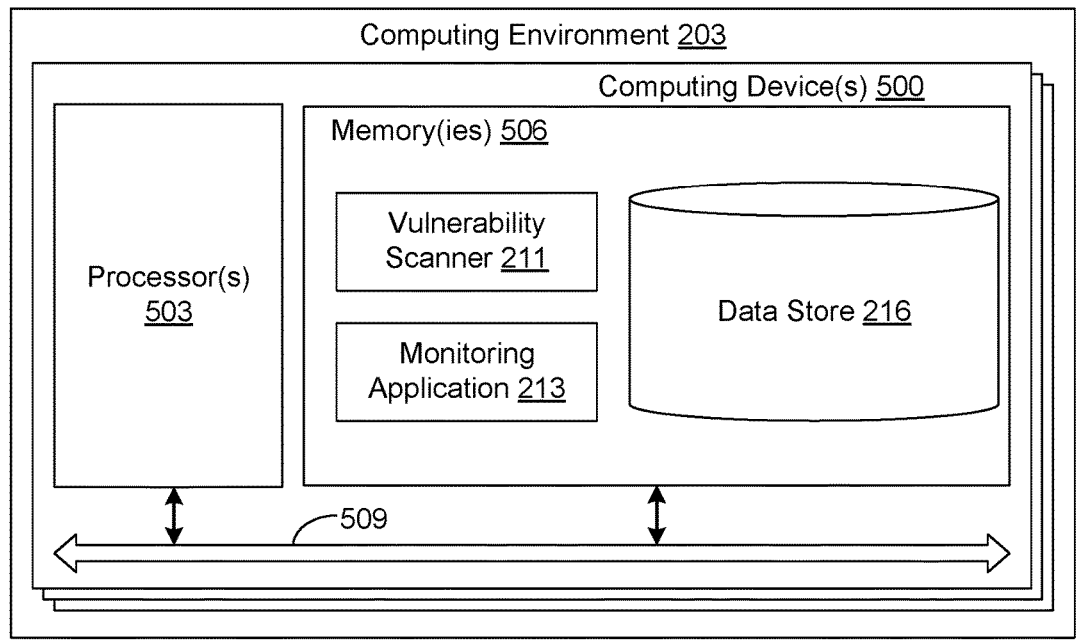
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may include, for example, at least one server computer or like device. The local interface 509 may include, for example, a data bus with an accompanying address/control bus or other bus structure as can be appreciated.

Stored in the memory 506 are both data and several components that are executable by the processor 503. In particular, stored in the memory 506 and executable by the processor 503 are the monitoring application 213, and potentially other applications. Also stored in the memory 506 may be a data store 216 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 503 may represent multiple processors 503 or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506. The local interface 509 may include additional systems designed to coordinate this communication, including, for example, performing load balancing. The processor 503 may be of electrical or of some other available construction.

Figure 6:
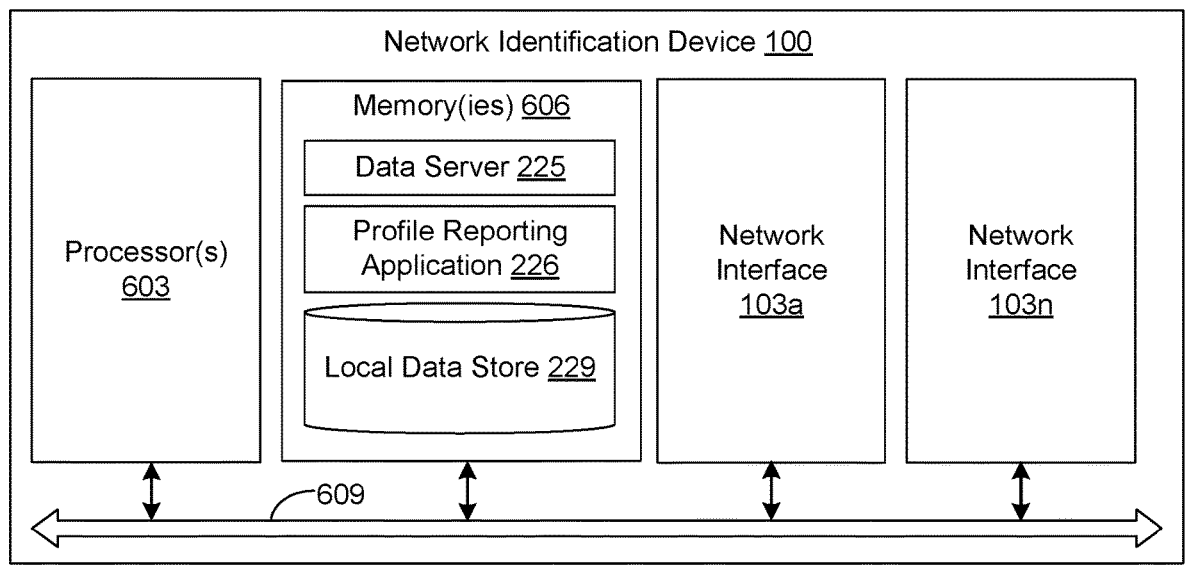
FIG. 6 is a schematic block diagram that provides one example illustration of a network identification device employed in the networked environment of FIG. 2 according to various embodiments of the present disclosure.

With reference to FIG. 6, shown is a schematic block diagram of the network identification device 100. Each network identification device 100 includes at least one processor circuit, for example, having a processor 603 and a memory 606, both of which are coupled to a local interface 609. The local interface 609 may include, for example, a data bus with an accompanying address/control bus or other bus structure as can be appreciated. One or more network interfaces 103*a-n* may also be connected to the local interface 609, allowing for communication between the network interfaces 103*a-n* and the processor 603 or memory 606.

Stored in the memory 606 are both data and several components that are executable by the processor 603. In particular, stored in the memory 606 and executable by the processor 603 are the data server 225, the profile reporting application 226, and potentially other applications. Also stored in the memory 606 may be a local data store 229 and other data. In addition, an operating system or firmware may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606 or network interfaces 103*a-n*, or between any two of the memories 606 or any two of the network interfaces 103*a-n* (e.g., as a network bridge). The local interface 609 may include additional systems designed to coordinate this communication, including, for example, performing load balancing. The processor 603 may be of electrical or of some other available construction.

Although the monitoring application 213 and the profile reporting application 226, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the monitoring application 213 and the profile reporting application 226. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 503 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrency. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the monitoring application 213 and the profile reporting application 226, that includes software or code can be embodied in any non-transitory computer-readable medium for use by or in connection with an instruction execution system such as, for example, a processor 503 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the monitoring application 213 and the profile reporting application 226, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A device, comprising:
a first network interface;
a second network interface bridged with the first network interface;
a processor;
a memory; and
machine readable instructions stored in the memory that, when executed by the processor, cause the device to at least:
receive a profile from a second computing device temporarily communicatively coupled to the device via the second network interface, the profile representing a first computing device communicatively coupled to the device via the first network interface and comprising a status of the first computing device;
store the profile in the memory;
analyze network traffic received via the second network interface and passing between the first network interface and the second network interface to identify a request for the profile from a third computing device, wherein the request is identified based at least in part on a specially formatted Ethernet frame that indicates the request for the profile; and
send the profile to the third computing device in response to identifying the specially formatted Ethernet frame.

2. The device of claim 1, wherein at least one of the first network interface or the second network interface is configured to receive an electrical voltage sufficient to power the device.

3. The device of claim 1, wherein the profile further comprises at least one of a manufacturer of the first computing device, a model number of the first computing device, or a unique identifier of the first computing device.

4. An apparatus, comprising:
a first network interface;
a second network interface;
a processor;
a memory;
a profile stored in the memory of the apparatus, the profile representing a first computing device communicatively coupled to the apparatus via the first network interface; and
machine readable instructions stored in the memory that, when executed by the processor, cause the apparatus to at least:
identify a request for the profile based at least in part on an identification of a specially formatted Ethernet frame received from a second computing device via the second network interface, the specially formatted Ethernet frame indicating the request for the profile;
process the request for the profile received from the second computing device via the second network interface, the profile comprising a status of the first computing device; and
send the profile to the second computing device via the second network interface, in response to identification of the specially formatted Ethernet frame.

5. The apparatus of claim 4, wherein:
a first network address is assigned to the first computing device;
a second network address is assigned to the apparatus; and
the machine readable instructions further cause the first computing device to at least:
analyze network traffic received via the second network interface to determine a destination network address for the network traffic;
forward to the first computing device network traffic with a destination network address that matches the first network address; and
analyze network traffic with a destination network address that matches the second network address for a presence of the request for the profile.

6. The apparatus of claim 4, wherein the machine readable instructions further cause the first computing device to at least:
receive the profile from a third computing device communicatively coupled to the apparatus; and
store the profile in the memory of the apparatus.

7. The apparatus of claim 6, wherein:
the profile is a first profile; and
the machine readable instructions further cause the first computing device to at least:
receive a second profile, the second profile representing a different computing device communicatively coupled to the first network interface; and
replace the first profile stored in the memory with the second profile.

8. The apparatus of claim 4, wherein at least one of the first network interface or the second network interface is configured to receive an electrical voltage sufficient to power the apparatus.

9. The apparatus of claim 4, wherein the profile comprises at least one of a manufacturer of the first computing device, a model number of the first computing device, a unique identifier of the first computing device.

10. A method, comprising:
sending, via at least one of one or more computing devices, a request to a first network interface of a network identification device, the request comprising a specially formatted Ethernet frame that identifies the request to the network identification device and the request specifying a device profile of a computing device assigned to the network identification device, the computing device being communicatively coupled to a second network interface of the network identification device bridged to the first network interface, and the device profile comprising a status of the computing device;
receiving, via at least one of the one or more computing devices, the device profile of the computing device assigned to the network identification device; and
verifying, via at least one of the one or more computing devices, an inventory record based at least in part on the device profile.

11. The method of claim 10, wherein the method further comprises updating, via at least one of the one or more computing devices, the inventory record based at least in part on the device profile.

12. The method of claim 10,
wherein the method further comprises generating, via at least one of the one or more computing devices, the specially formatted Ethernet frame.

13. The method of claim 10, wherein:
the request comprises a specially formatted internet protocol (IP) packet; and the method further comprises generating, via at least one of the one or more computing devices, the specially formatted IP packet.

14. The method of claim 10, further comprising sending, via at least one of the one or more computing devices, an updated device profile for the computing device to the network identification device.

15. The method of claim 10, wherein the network identification device is one of a plurality of network identification devices connected to a network.

16. The method of claim 10, wherein the status of the computing device comprises a version number of an operating system or a firmware installed on the computing device.

17. The method of claim 10, wherein the device profile comprises at least one of a manufacturer of the computing device, a model number of the computing device, or a unique identifier of the computing device.

18. The device of claim 1, wherein the request comprises a specially formatted internet protocol (IP) packet.

19. The apparatus of claim 4, wherein the request comprises a specially formatted internet protocol (IP) packet.

20. The apparatus of claim 4, wherein the status of the first computing device comprises a version number of an operating system or a firmware installed on the first computing device.

* * * * *